United States Patent [19]

Consolini

[11] Patent Number: 5,753,811
[45] Date of Patent: May 19, 1998

[54] AERODYNAMIC TUNNEL PARTICULARLY SUITED FOR ENTERTAINMENT PURPOSES

[75] Inventor: Silvia Consolini, Calle Naiguata, Venezuela

[73] Assignee: Inversiones Bernoulli C.A., Chuao, Venezuela

[21] Appl. No.: 720,902

[22] Filed: Oct. 10, 1996

Related U.S. Application Data

[63] Continuation-in-part of Ser. No. 491,530, Jun. 16, 1995, abandoned.

[30] Foreign Application Priority Data

Jul. 19, 1994 [VE] Venezuela .................... 001041

[51] Int. Cl.⁶ .................... G01M 9/00; A63G 31/04
[52] U.S. Cl. .................... 73/147; 472/50
[58] Field of Search .................... 73/147, 168; 434/34, 434/247, 258; 472/3, 50, 59, 67, 68, 75, 134, 136, 137, 57

[56] References Cited

U.S. PATENT DOCUMENTS

| | | | |
|---|---|---|---|
| 3,484,953 | 12/1969 | Norheim, Jr. | 73/147 |
| 4,034,604 | 7/1977 | Decher et al. | 73/147 |
| 4,457,509 | 7/1984 | St.-Germain | 434/258 |
| 5,593,352 | 1/1997 | Methfessel et al. | 472/50 |

*Primary Examiner*—William L. Oen
*Attorney, Agent, or Firm*—Howard C. Miskin

[57] ABSTRACT

An aerodynamic tunnel particularly suited for entertainment purposes is disclosed. The aerodynamic tunnel includes a converging section and a diffuser system having one or more vertical diffusers all of which cooperate with each other to efficiently produce a vertical column of air that allows a person, positioned within the air column, to experience a state of weightlessness.

8 Claims, 3 Drawing Sheets

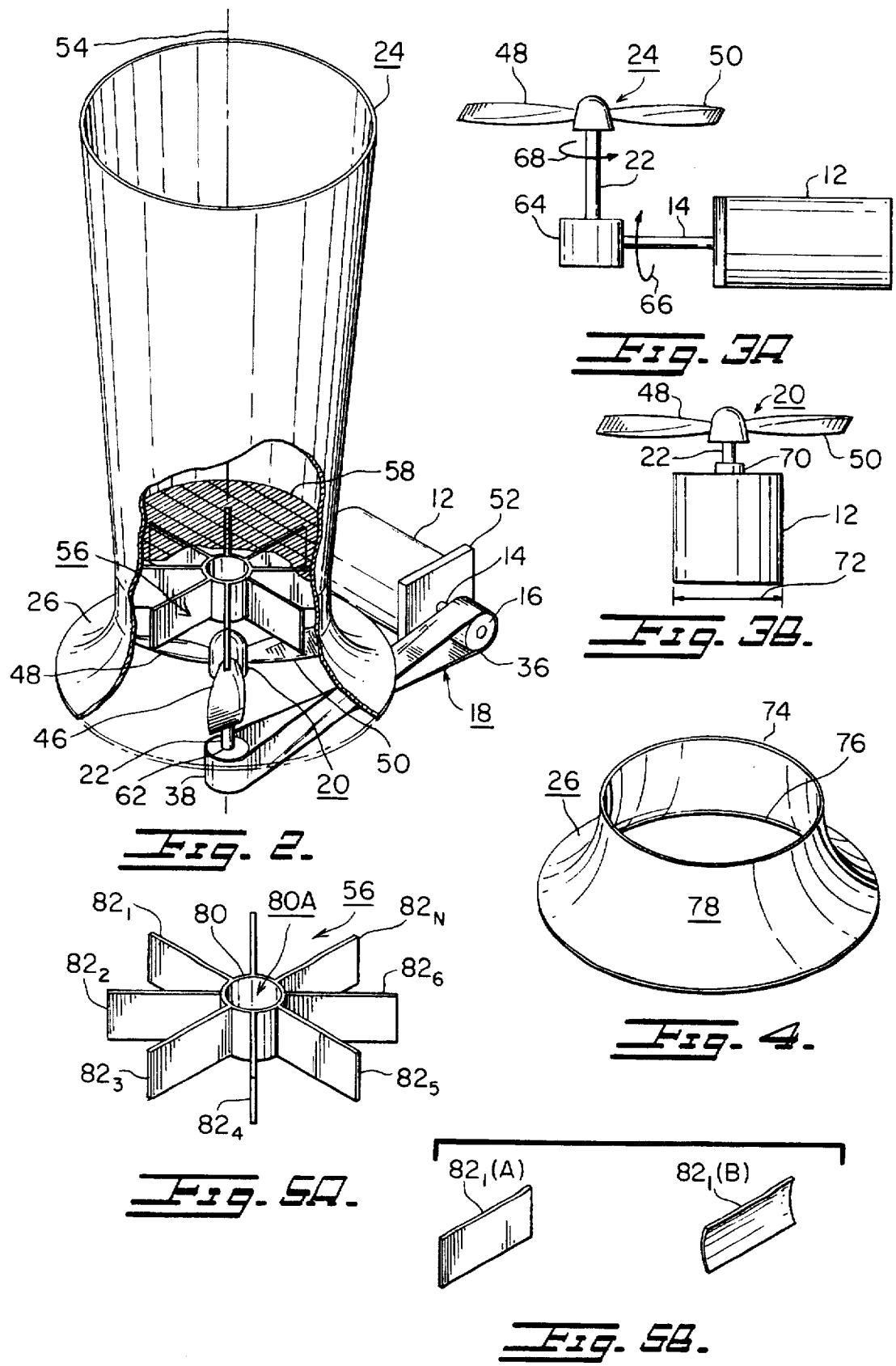

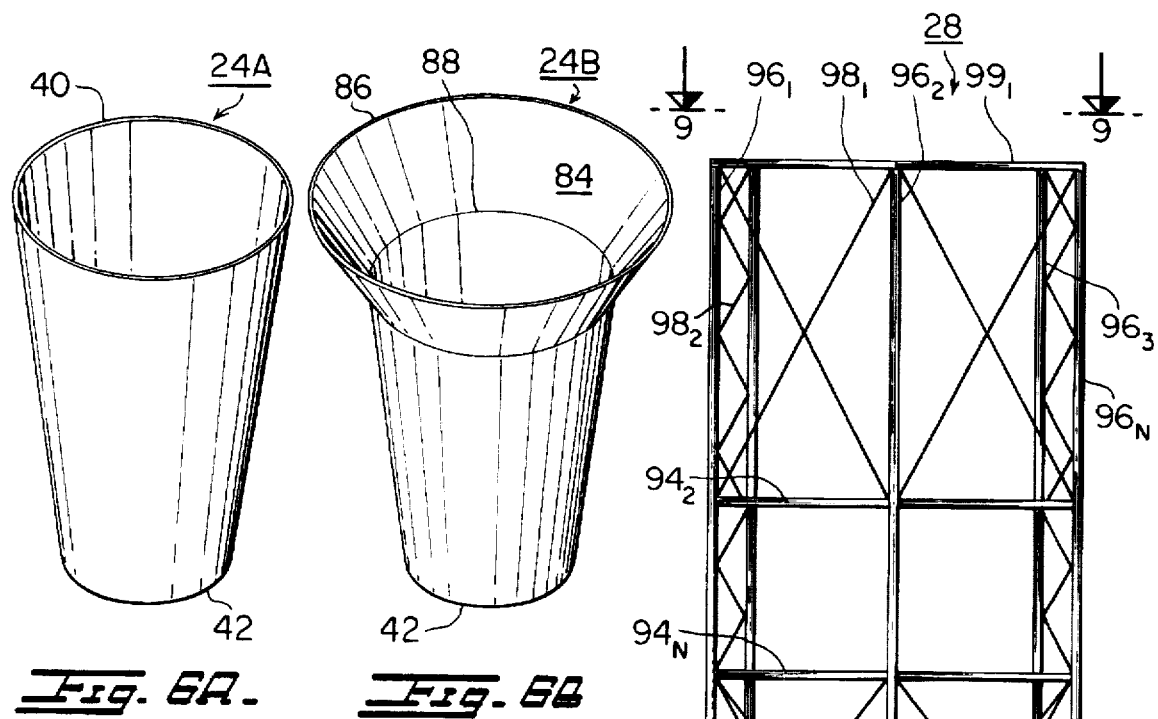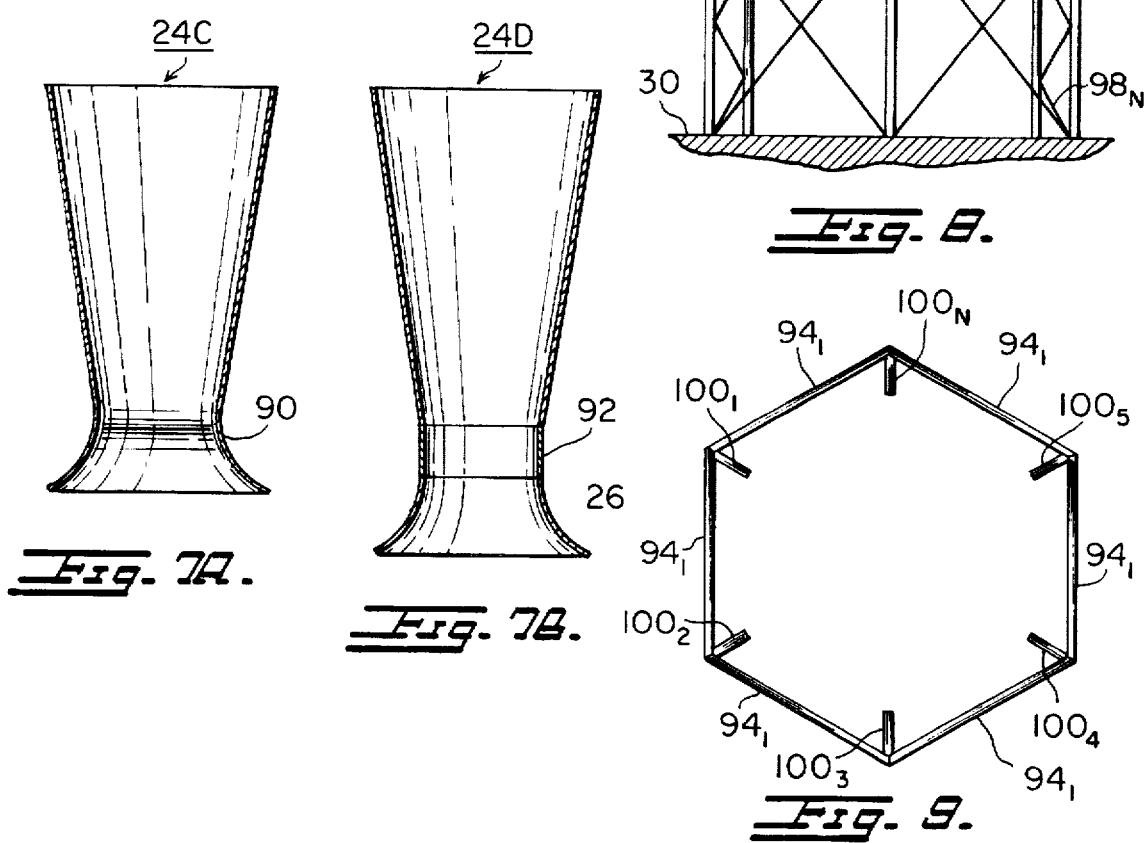

AERODYNAMIC TUNNEL PARTICULARLY SUITED FOR ENTERTAINMENT PURPOSES

CROSS REFERENCE TO RELATED APPLICATION

The present application is a continuation-in-part of parent application Ser. No. 08/491.530 filed Jun. 16, 1995, now abandoned, which, in turn, has a priority date of Jul. 19, 1994 based on a Venezuelan application Ser. No. 001.041.

BACKGROUND OF THE INVENTION

1. Field of the Invention

The present invention is related to aerodynamic tunnels and more particularly, to an aerodynamic tunnel particularly suited for entertainment purposes, such as skydiving simulation and which produces a vertical column of air that substantially matches the forces of gravity acting on a person so that the person experiences a state of weightlessness resulting in the person being able to float or levitate therein.

2. Description of the Prior Art

As is known in the art, apparatuses may be provided that develop a column of air that allows for the levitation of the human beings for experimental or entertainment purposes. Although these devices serve well their intended purpose, it is further desired that the efficiency of developing the column of air to allow for the levitation of a person be provided in a more efficient and cost effective manner.

SUMMARY OF THE INVENTION

The present invention relates to an aerodynamic tunnel that produces a vertical column of air which matches the forces of gravity acting on a person so that the person can remain suspended within the air column. The aerodynamic tunnel is an open system meaning it is exposed to the ambient and air is not circulated therein.

The aerodynamic tunnel comprises a power source, a transmission, a propeller, a converging section, a diffuser system having one or more vertical diffusers, flow directing means, and means for supporting the at least one vertical diffuser. The power source imparts motion to an output shaft thereof that has coupling means affixed thereto. The transmission has first and second ends, with the first end coupled to the coupling means of the output shaft. The propeller is rotatable and has an axle attached to the second end of the transmission. The converging section admits and accelerates any incoming air and comprises at least upper and lower mouths each with a different diameter with one being larger than the other and brought together with a continuous closed surface. The converging section is arranged to encompass the propeller with the axle of the propeller being coaxial with an axis of the converging section, and with the mouth of the converging section having the larger diameter being positioned below the propeller. The diffuser system has one or more diffusers, the first of which merges with the other mouth of the converging section. The flow directing means has a central duct from which radiate outward therefrom a plurality of members that are spaced apart from each other. The central duct is located above the propeller and coaxial with the axle of the propeller. The means for supporting the at least one vertical diffuser comprises a plurality of horizontal support means and a plurality of vertical columns. The plurality of horizontal support means has first and second ends with the first ends having means for being coupled to the at least one vertical diffuser. The plurality of vertical columns are arranged in a counterposed manner relative to each other and are connected to the second end of the horizontal support means.

BRIEF DESCRIPTION OF THE DRAWINGS

FIG. 2 illustrates further details of the aerodynamic tunnel shown therein as being removed from its structural members.

FIGS. 3A and 3B show alternate embodiments of the propeller arrangement of FIG. 1A.

FIG. 4 illustrates a converging section of the aerodynamic tunnel.

FIGS. 5A and 5B illustrate further details of the flow directing means shown in FIG. 2.

FIGS. 6A, 6B, 7A and 7B illustrate various embodiments of the vertical diffusers of the diffuser system of the present invention.

FIG. 8 illustrates details of the structure means for supporting the one or more vertical diffusers of the diffuser system.

FIG. 9 is a view, taken along line 9—9 of FIG. 8, showing further details of the support means of the present invention.

DESCRIPTION OF THE PREFERRED EMBODIMENTS

Figure 1:
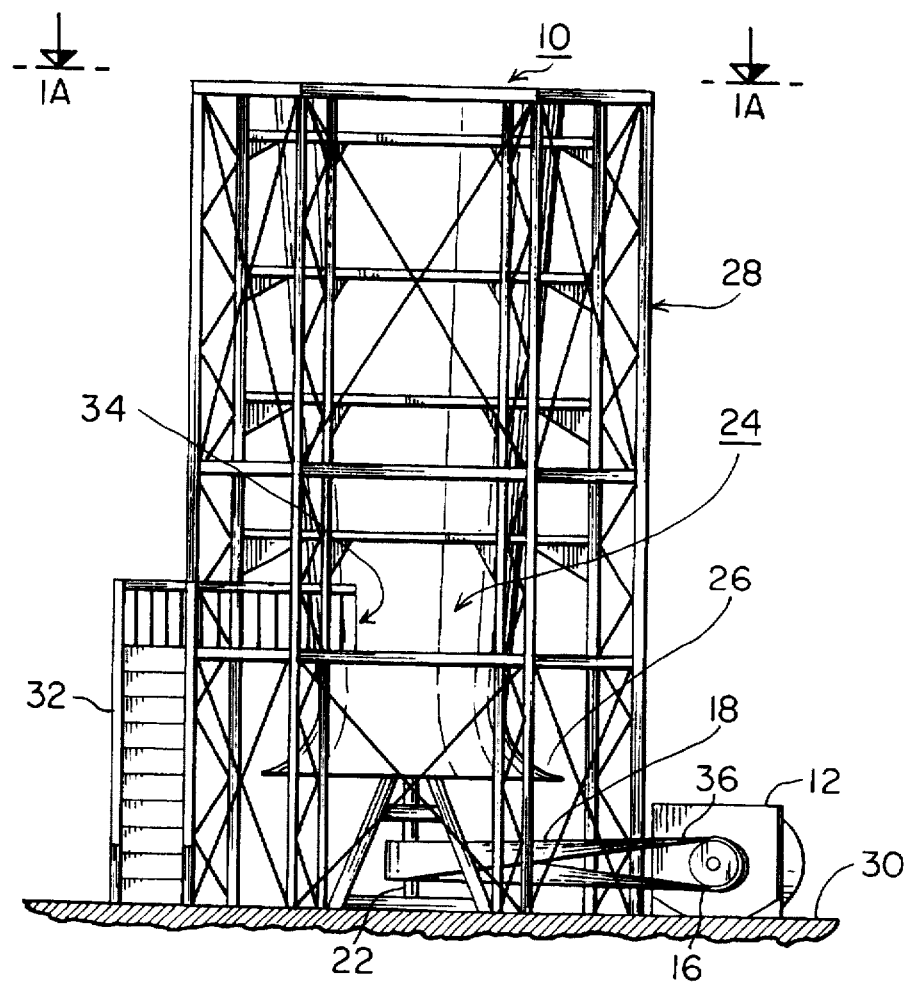
FIG. 1 is a front view of the aerodynamic tunnel of the present invention.

With reference to the drawing, wherein the same reference numbers are used to indicate the same elements throughout, there is shown in FIG. 1 an aerodynamic tunnel 10 embodying the principles of the present invention. The aerodynamic tunnel 10 may be used for experimental purposes, but is particularly suited for entertainment purposes, such as skydiving simulations, to develop a vertical column of air that substantially matches the forces of gravity acting on a person so that the person experiences a state of weightlessness. More particularly, when a person places himself into the vertical column of air produced by the aerodynamic tunnel 10, the vertical column of air substantially matches the forces of gravity acting on a person so that the person can remain suspended or levitated within the column of air. From FIG. 1, it should be noted that the aerodynamic tunnel 10 has its top (as viewed in FIG. 1) opened so that the aerodynamic tunnel 10 serves as an open system having one end exposed to the ambient and not recirculating air within the aerodynamic tunnel 10. From FIG. 1, it should be further noted and as will be further described herein, the aerodynamic tunnel 10 comprises converging and diffuser sections (all known in the art) that are utilized by the present invention to develop and manage the vertical column of air developed by the aerodynamic tunnel 10 in a more efficient manner.

In general, the aerodynamic tunnel 10 comprises a power source 12 that imparts motion to an output shaft 14 (not shown in FIG. 1 but to be described with reference to FIG. 1A) which is rigidly connected to a coupling means, such as a pulley 16. The aerodynamic tunnel 10 further comprises a transmission 18, a rotatable propeller 20 (not shown in FIG. 1 but to be described with reference to FIGS. 2, 3A and 3B) having an axle 22. The aerodynamic tunnel 10 further includes a diffuser system 24 having at least one vertical diffuser, the first of which merges with a converging section 26 and which diffusion system 24 is supported by support means 28 that rests on the ground 30. The support means 28 is also interconnected to a pair of stairs 32 that leads into an entrance opening 34 (not shown) of the diffuser system 24. As seen in FIG. 1, the transmission 18 has first and second ends 36 and 38 that are respectively connected to the pulley 16 of the power source 12 and to the axle 22 of the propeller 20. The power source 12 and the propeller 20 may be further described with reference to FIG. 1A, which is a view taken along line 1A—1A of FIG. 1.

Figure 1A:
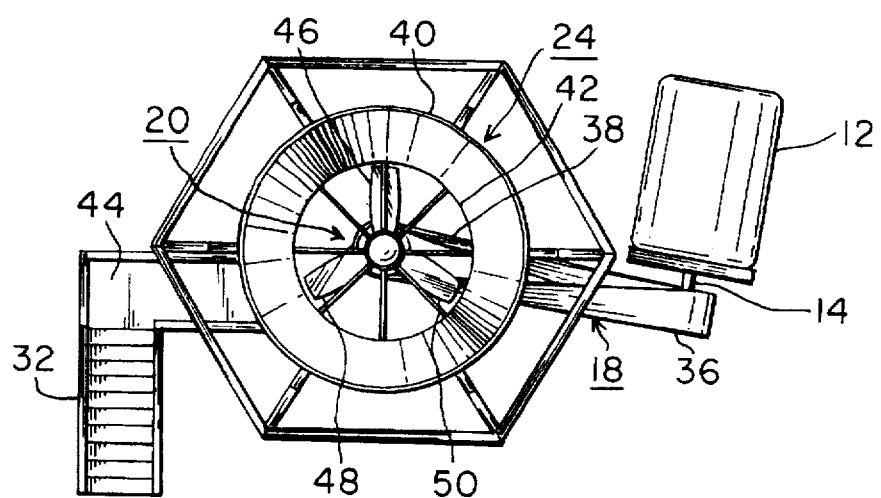
FIG. 1A is a view of the aerodynamic tunnel, taken along line 1A—1A of FIG. 1.

As seen in FIG. 1A, the power source 12 has its output shaft 14 extending thereout and may be a motor selected from the group driven by power sources comprising diesel, gas, electric and any other conventional type. The diffuser system 24, as viewed from FIG. 1A, has an outer rim 40 and an inner rim 42. The outer and inner rims 40 and 42 are made up of the one or more vertical diffusers comprising the diffuser system 24 and the first or lowest (as viewed in FIG. 1A) of the vertical diffusers merge with the converging section 26 serving as a nozzle, in a manner known in the art. It should be noted that the converging section 26 is hidden from the view of FIG. 1A. However, as further seen in FIG. 1A, the stairs 32 has a platform 44 that is arranged to be in correspondence with the entrance section 34 of the diffuser system 24. As further seen in FIG. 1A, the propeller 20 has a plurality of blades, such as 46, 48 and 50, that are spaced apart from each other by a predetermined distance (known in the art) and when the propeller 20 is rotated, it causes the air to be pushed into the blades 46, 48 and 50. The propeller 20 as well as the power source 12 may be further described with reference to FIG. 2 which primarily illustrates the diffuser system 24 as being removed from its support structure 28.

As seen in FIG. 2, the power source 12 has a mounting member 52 that not only supports the power source 12 but also has an aperture to allow the passage of the output shaft 14 having the pulley 36 connected thereto on the other side of the support 52. As further seen in FIG. 2, the diffuser system 24 has a coaxial axis 54 that is arranged to be perpendicular to the ground 30 (shown in FIG. 1). The axis 54 is coaxial with the axis of the converging section 26 which, in turn, is coaxial with the axis of the axle 22. As further seen in FIG. 2, a flow direction means 56 has a grate 58 resting thereon and both of which are positioned above the propeller 20. The grate 58 provides a platform upon which a person rests his/her feet upon entering the diffuser system 24 from the entrance portion 34 shown in FIG. 1.

The axle 22 of the propeller 20 is connected to a coupling device 62 which, in turn, is coupled to the second end 38 of the transmission 18 comprising a belt arrangement shown in FIG. 2. The propeller 20 need not be coupled with a belt arrangement, but rather may utilize solid shaft arrangements which may be further described with reference to two alternate embodiments, shown in FIGS. 3A and 3B.

As seen in FIG. 3A, the axle 22 of the propeller 20 is connected to a universal joint 64. The universal joint 64 provides a coupling for transmitting the rotation of shaft 14, rotating in one direction, such as indicated by arrow 66, to cause the axle 22 to rotate in another direction, such as indicated by arrow 68, wherein the directions of rotations 66 and 68 are not collinear with each other.

As seen in FIG. 3B, the axle 22 of the propeller 20 may be connected to a coupling device 70 that allows the axle 22 to be directly and vertically coupled to the power source 12. It should be noted that for the embodiment of FIG. 3B, the power source 12 can have a diameter 72 dimensioned to allow the power source 12 to be positioned within or under (as viewed in FIG. 1) the converging section 26. The converging section 26 may be further described with reference to FIG. 4.

The converging section 26 has at least upper and lower mouths 74 and 76, each with a different diameter and one of which is larger than the other and which are brought together with a continuous closed surface 78. The converging section 26 is arranged and contoured to serve as a nozzle operating in a manner known in the art and efficiently managing the flow of air, in a manner to be described hereinafter. The converging section 26 is also arranged to preferably encompass the propeller 20, as shown in FIG. 2. As also seen in FIG. 2, the flow directing means 56 is positioned above the propeller 20 and may be further described with reference to FIGS. 5A and 5B.

As seen in FIG. 5A, the flow directing means 56 has a central duct 80 with an opening 80A therein. As further seen in FIG. 5A, a plurality of structural members $82_1$, $82_2$, $82_3$, $82_4$, $82_5$, $82_6$, . . . $82_N$ radiate outward from the central duct 80, and are spaced apart from each other by a predetermined distance. The opening $80_A$ is not only located above the propeller 80, but is also coaxial with the axle 22 of the propeller 20.

As seen in FIG. 5B, the plurality of structural members, e.g., the first radiating member $82_1$, has a selected contour that is either straight or curved, as respectively shown in FIG. 5B by the reference nomenclatures $82_1(A)$ and $82_1(B)$. The flow directing means 56 is arranged, in a manner known in the art, relative to the propeller 20 so as to intercept and direct the movement of air produced by the propeller 20. The flow directing means 56 directs the air to move in a relatively straight manner so as to reduce any flow turbulence which may otherwise be created. The flow directing means 56 cooperates with the advantageous operation of the diffuser system 24, which may have various embodiments illustrated in FIGS. 6A, 6B, 7A and 7B and generally designed therein with reference number nomenclature 24A, 24B, 24C and 24D.

The diffuser system embodiment 24A is quite similar to the diffuser system 24 of FIG. 1 and, accordingly, illustrates the same outer and inner rims 40 and 42 respectively. However, the diffuser system 24A is shown as not being mated to converging section 26, while in actuality such mating is present. The diffuser system 24A, as well as the other embodiments 24, 24B, 24C and 24D, may comprise one or more vertical diffusers. The one or more vertical diffusers, as well as the converging section, may have circular or polygon shaped inner surfaces. As is known in the art, diffusers are commonly referred to as having a channel in which the velocity of the fluid therein is decreased while the pressure therein is increased.

The diffuser system embodiment 24B has an upper section 84 with outer and inner rims 86 and 88 respectively, wherein the inner rim 88 has a diameter which is greater than the inner rim 42 located at the lower portion of the diffuser system embodiment 24B.

The diffuser system embodiment 24C has a lower portion 90 which is integrated with the remainder of the diffuser system embodiment 24C, and may serve in a similar manner as the converging section 26 (nozzle) of FIGS. 1 and 4.

The diffuser system embodiment 24C has a connecting section 92 which mates the converging section 26 to the remainder of the diffuser system embodiment 24D.

In operation, and in a manner known in the art, the diffuser system 24, 24A, 24B, 24C or 24D, each cooperating with a converging section (nozzle) 26 or 90, and each includes one or more vertical diffusers in which each diffuser serves as a fluid device that gradually reduces the speed of the air passing through it and exiting to the ambient (top of diffuser system 24, 24A, 24B, 24C and 24D as viewed in FIG. 1). This operation of the one or more diffusers increases the energy efficiency of the wind tunnel 10 because it takes less energy to cause the exit of the air from the diffuser at lower speeds.

There is another advantage to the use of a one or more vertical diffusers making up the diffuser system 24, 24A, 24B, 24C or 24D in the wind tunnel 10 of the present invention. More particularly, by having different air speeds at different heights, gradients are created by the one or more vertical diffusers which also enhances user performance with regard to terminal velocity. Terminal velocity is the air speed at which drag equals gravity. Bodies within the diffuser system 24, 24A, 24B, 24C or 24D exhibit less drag and therefore are capable of having more terminal velocity variations. The user can modify his drag by changing body position which consequently modifies terminal velocity. The use of the one or more vertical diffusers of the diffuser system 24, 24A, 24B, 24C or 24D allows the user to stay within the flying area (so called in skydiving applications) without any corrections because of the gradient of air speeds created by the vertical diffusers of the invention within the wind tunnel 10. The diffuser system 24, 24A, 24B, 24C or 24D, and more particularly diffuser system 24 of FIG. 1, is supported by a support means 28 which may be further described with reference to FIG. 8.

The support means 28 comprises a plurality of horizontal support means $94_1, 94_2 \ldots 94_N$ and a plurality of vertical support columns $96_1, 96_2, 96_3 \ldots 96_N$. The horizontal support means $94_1 \ldots 94_N$ are connected to vertical support columns $96_1, 96_2, 96_3 \ldots 96_N$ by cross-support members $98_1, 98_2 \ldots 98_N$, as shown in FIG. 8. The vertical support columns $96_1, 96_2, 96_3 \ldots 96_N$ are arranged in a counterposed manner, relative to each other, and are supported by the ground 30. The horizontal support means has first and seconds ends with the first end connected to means $100_1, 100_2, 100_3, 100_4, 100_5 \ldots 100_N$ which are illustrated in FIG. 9, which is a view taken along line 9—9 of FIG. 8.

As seen in FIG. 9, the horizontal support means, e.g., $94_1$ has its first end connected to the means $100_1 \ldots 100_N$ which are abutted against the diffuser system 24 not shown in FIG. 9 for the sake of clarity but generally illustrated in FIG. 1.

It should now be appreciated that the practice of the present invention provides an aerodynamic tunnel that produces a vertical column of air to allow a person to experience a state of weightlessness. The efficiency of the production of the vertical column of air is increased by a converging section acting as a nozzle that cooperates with the diffuser system comprised of one or more vertical diffusers, all constructed in accordance with the practice of the present invention.

What I claim is:

1. An aerodynamic tunnel opened at one end and particularly suited for entertainment purposes to develop a vertical column of air that substantially matches the forces of gravity acting on a person within the air column so that the person experiences a state of weightlessness, said opened aerodynamic tunnel comprising:

(a) a power source that imparts motion to an output shaft thereof and having coupling means affixed thereto;

(b) a transmission having first and second ends with the first end coupled to said coupling means of said output shaft;

(c) a rotatable propeller having an axle attached to the second end of said transmission;

(d) a converging section that admits and accelerates any incoming air, said converging section comprising at least upper and lower mouths each with a different diameter with one larger than the other and brought together with a continuous closed surface, said converging section being arranged to encompass said propeller with said axle being coaxial with an axis of said converging section and with the mouth of said converging section having the larger diameter being positioned below said propeller;

(e) a diffuser system with an axis coaxial with said axis of said converging section and having one or more vertical diffusers, the first of which being merged with the other mouth of said converging section;

(f) a flow directing means having a central duct from which radiates outward therefrom a plurality of structural members spaced apart from each other by a predetermined distance, said central duct being located above said propeller and coaxial with said axle of said propeller; and (g) means for supporting said at least one vertical diffuser comprising:

(i) a plurality of horizontal support means having first and second ends with the first end connected to means which abut against said at least one diffuser; and (ii) a plurality of vertical columns arranged in a counterposed manner relative to each other and are connected to said second end of said horizontal support means.

2. The aerodynamic tunnel according to claim 1, wherein said power source may be a motor excited by a drive source selected from the group comprising diesel, gas and electric devices.

3. The aerodynamic tunnel according to claim 2, wherein said transmission is adapted to be connected to the output shaft of said selected motor.

4. The aerodynamic tunnel according to claim 1, wherein said rotatable propeller has a plurality of blades each being dimensioned to fit into said converging section.

5. The aerodynamic tunnel according to claim 1, wherein said upper and lower mouths have one of circular and polygonal shapes.

6. The aerodynamic tunnel according to claim 1, wherein said plurality of radiating members of said flow directing means have one of a straight and curved profiles.

7. The aerodynamic tunnel according to claim 1, wherein said means for supporting said at least one diffuser further comprises cross-members interconnected between said vertical horizontal support means and said vertical columns.

8. The aerodynamic tunnel according to claim 1, wherein said diffuser system has an entrance opening and further comprising a grate located above said flow directing means and near said entrance opening.

* * * * *